United States Patent [19]

Ditlinger

[11] Patent Number: 4,973,372

[45] Date of Patent: Nov. 27, 1990

[54] METHOD OF MAKING A TIE-BAR WITH INTERNAL LUBRICATION

[75] Inventor: Richard J. Ditlinger, South Bend, Ind.

[73] Assignee: Allied-Signal Inc., Morristown, N.J.

[21] Appl. No.: 383,672

[22] Filed: Jul. 24, 1989

Related U.S. Application Data

[60] Division of Ser. No. 804,231, Dec. 3, 1985, Pat. No. 4,873,889, which is a continuation-in-part of Ser. No. 645,210, Aug. 24, 1984, abandoned.

[51] Int. Cl.$^5$ .......................... G05G 1/00; B65H 81/00
[52] U.S. Cl. ..................................... 156/172; 156/169; 156/242; 156/245; 74/579 R; 464/903
[58] Field of Search ....................... 156/169, 172, 173; 464/55, 69, 903; 74/579 R, 579 E, 581; 416/134 A

[56] References Cited

U.S. PATENT DOCUMENTS

| | | | |
|---|---|---|---|
| 3,460,628 | 8/1969 | Tankersley | 156/169 X |
| 3,692,361 | 9/1972 | Ivarsson | 74/579 R X |
| 4,019,346 | 4/1977 | Fukuda | 464/903 X |
| 4,483,214 | 11/1984 | Mayer | 416/134 A X |
| 4,552,035 | 11/1985 | Skipper | 74/581 |

Primary Examiner—Michael W. Ball
Assistant Examiner—Jeff H. Aftergut
Attorney, Agent, or Firm—Larry J. Palguta; Ken C. Decker

[57] ABSTRACT

The tie-bar (10) comprises a pair of spaced-apart bushings (12, 14) each having end flanges (16) extending from a central cylindrical portion and a through opening (18) for connecting to flexing structures. A plurality of wires (20) comprises bands (22) of parallel wires (20) wrapped endlessly about the spaced-apart bushings (12, 14) provide a tie-bar (10) having bushings (12, 14) disposed at the ends and connected by a pair of spaced-apart side portions (24) of superimposed bands (22). The wires (20) are coated with a dry film lubricant so that the wires (20) are dry wrapped about the bushings (12, 14), and then a resin material (23) encapsulated about the dry wrapped wire bands (22) and bushings (12, 14). A body (26) of resin material disposed between the spaced-apart side portions (24) and the bushings (12, 14) maintains the spaced-apart relationship of the bushings (12, 14) by withstanding the compressive tension of the tightly wrapped wires (20). The wires (20) are free to move relative to one another in response to tension and torsional forces exerted upon the tie-bar (10).

6 Claims, 1 Drawing Sheet

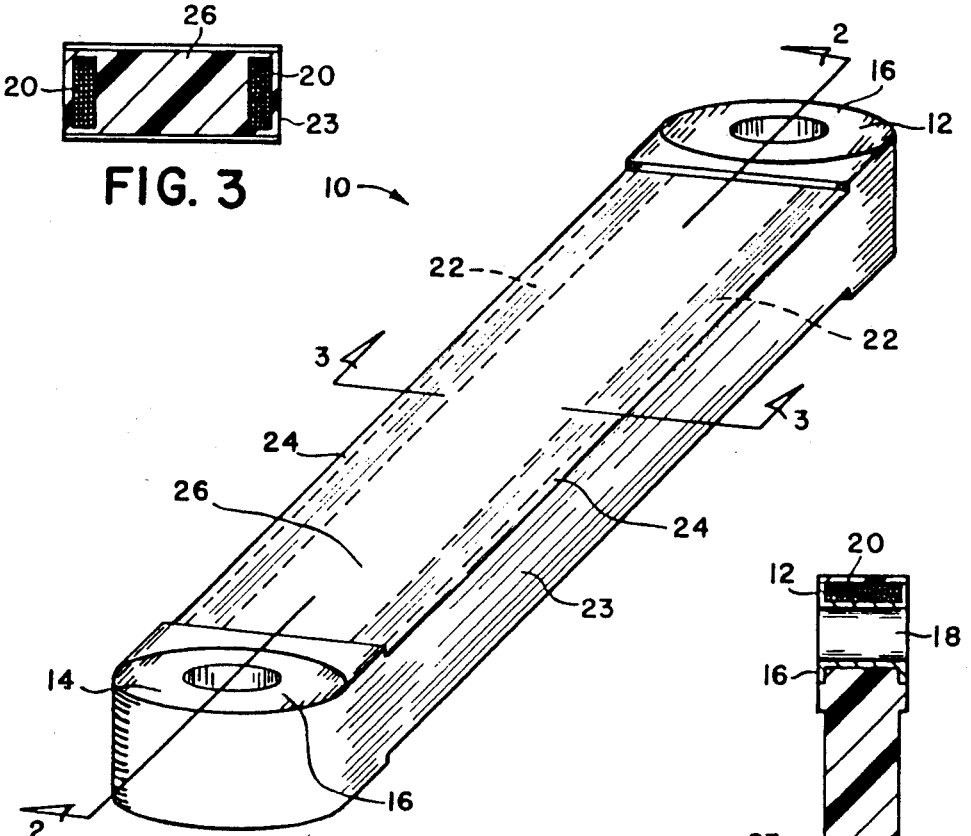
FIG. 3
FIG. 1
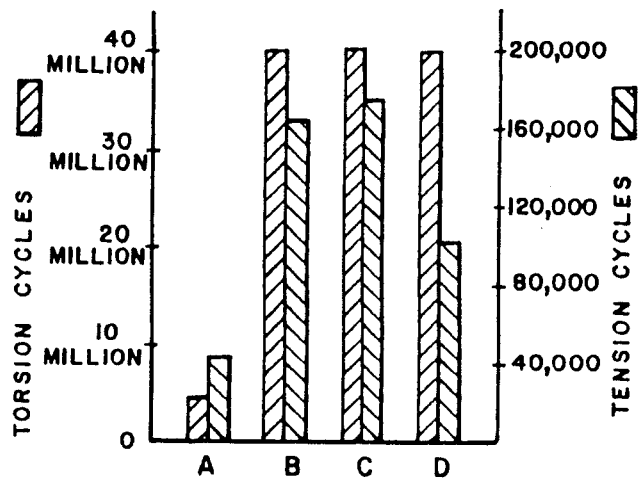
FIG. 4
FIG. 2

METHOD OF MAKING A TIE-BAR WITH INTERNAL LUBRICATION

This is a divisional of co-pending application Ser. No. 06/804,231 filed on Dec. 3, 1985, now U.S. Pat. No. 4873889 which is a continuation of abandoned application Ser. No. 06/645,210 filed Aug. 24, 1984.

The present invention relates to a tie-bar with internal lubrication between individual wire strands of the assembly whereby the wire strands are free to move relative to one another as a result of axial and torsional forces exerted thereon.

It has been the practice to make structures subjected to high tensile and torsional loading, for example the connecting members or tie-bars between helicopter rotor blades and the driving rotor, from a pair of metal bushings connected together by endless strands of parallel wires secured together by an adhesive resin such as urethane, with the resin disposed between each of the wires. Such urethane impregnated tie-bar assemblies are illustrated in U. S. Pat. Nos. 3,434,899 and 3,460,628 issued to James A. Tankersley on Mar 25, 1969 and Aug. 12, 1969, respectively, and both assigned to the same assignee as herein. Urethane impregnated tie-bar assemblies present a number of problems in their manufacture and use. The tie-bar is wet wrapped during the assembly process and the urethane material comprises a carcinogenic material which requires that workers wear protective clothing in an enclosed area because of the inherent dangers. During the wrapping procedure, the urethane material can set up in approximately fifteen minutes, such that the assembly process must be continuous and additional new amounts of urethane added when the urethane in the applicator reservoir sets up and becomes too firm for further effective wrapping. This problem relates generally to the pot life of the urethane material during the wrapping procedure. The urethanes utilized comprise the castable type which is placed within a form and assumes the casted form of the material, and which results in a costly assembly operation. During use, the urethane matrix separating the wires prevents galling or rubbing abrasion between the wires as a result of sheer deflections between the wires during operational twist cycles of the associated rotor blade. However, the continuous axial and torsional forces exerted upon the tie-bar during the operational twist cycles eventually deteriorate the urethane material of the matrix such that the galling between the wires may occur, and eventual delamination occurs. This has deliterious affects upon the operational wear life of the tie-bar. During assembly, the portions of the urethane coated wire strands which are wrapped about the bushings occupy a smaller volume than do the portions of the wires disposed between the bushings. This is because the wires are wrapped tightly about the bushings such that there is a radially inward force exerted by the wires against the bushings to compress the laminations of wires and minimize the amount of urethane contained between the wires. In the areas between the bushings, ie., the parallel side portions of the laminations of wires, there is no radially inward force other than the parallel wires disposed adjacent one another and thus the urethane matrix causes an increase in thickness of the wire form cross-section in the region between the bushings and results in an increase in the envelope of the tie-bar. Prior tie-bars have a solid body of urethane disposed between the parallel side portions of the laminations, but this body of urethane contributes no useful function because the tie-bars use the urethane impregnated matrix to maintain tension effected by the wrapping procedure.

Because of the above problems inherent with castable urethane impregnated tie-bar assemblies, it is desirable to provide a tension-torsion tie-bar assembly which may be assembled in the initial wrapping procedure without the use of any carcinogenic material. A tension-torsion tie-bar produced by a dry wrap process should provide a plurality of superimposed bands of wires which will permit free movement of the wires relative to one another, without galling or abrasion between the wires during the operational twist cycles of the flexing structures attached to the tie-bar. It is desired that the wires provide for the free movement of each other relative to one another whereby uneven force stresses exerted at the bushings are dissipated to the areas of the wires in the region between the bushings.

The present invention comprises a tension-torsion tie-bar assembly which includes a pair of bushings each having a cylindrical center portion within flanges extending therefrom, and a through opening therethrough. A plurality of superimposed bands comprising wire filaments each having a dry film lubricant thereon, are wrapped endlessly about the bushings such that the bushings are in spaced-apart relationship with parallel or side portions of the wires extending therebetween. A low modulus resin or elastomeric material is then disposed about the bushings and superimposed bands so that they are encapsulated, and the area between the side portions of the wires comprises a solid body of resin or elastomeric material maintaining the compressive tension exerted by the superimposed bands on the spaced-apart bushings.

The invention is described in detail with reference to the drawings which illustrate:

FIG. 1 is an isometric view of the tension-torsion tie-bar assembly of the present invention;

FIG. 2 is the cross sectional view taken along view line 2—2 of FIG. 1;

FIG. 3 is a cross sectional view taken along view line 3—3 of FIG. 1; and

FIG. 4 illustrates the performance that results for a prior tie-bar and tie-bars made in accordance with the present invention.

The present invention comprises a tension-torsion tie-bar that may be utilized as a connecting member between a helicopter rotor blade and the driving rotor, such as illustrated in Tankersley U. S. Pat. Nos. 3,434,899 and 3,460,628, each patent being incorporated by reference herein. The urethane impregnated tie-bar assemblies provide an undesirable sheer bond effect because the urethane is disposed between each of the wires so that a urethane matrix encompasses the superimposed bands of wires. During the twist operational cycles, forces cause the wires to move relative to one another and this is resisted by the urethane material disposed between the individual wires. As a result, this produces the undesirable sheer bond effect which resists the movement of the wires relative to one another. In the areas where the wires are wrapped around the bushings, the wires at different radii are strained differently and because the urethane material secures the wires together, the urethane matrix does not permit dissipation of forces to the two side portions of the wires disposed in the region between the bushings. The urethane material of the prior art structures is necessary in order to keep the bushings in their spaced-apart relationship and maintain the compressive force exerted by the wrapped wires against the bushings. While the urethane material initially maintains the compressive tension exerted by the wire laminations between the bushings, the shear bonds eventually weaken which leads to eventual deterioration of the tie-bar assembly.

The present invention comprises a tension-torsion tie-bar assembly designated generally by reference numeral 10 in FIGS. 1–3. The tie-bar assembly 10 comprises a pair of bushings 12 and 14 disposed in a spaced-apart relationship in the assembly. Each bushing 12, 14 includes end flanges 16 extending radially outwardly from cylindrical portions which include through openings 18 therein. The bushings 12, 14 are disposed in a fixture similar to the fixture illustrated and explained in the Tankersley U.S. Patent number 3,434,899, incorporated by reference herein. However, the assembly procedure for the tie-bar of the present invention is significantly different and provides for certain major advantages and reduction in costs, as will be explained hereinafter. Referring to FIGS. 2 and 3, a plurality of filaments 20 comprising dry film lubricant coated wires are wrapped continuously in an endless connection disposed about the bushings 12 and 14. The wires are coated with a dry film lubricant such as graphite, molybdenum disulfide, or any equivalent lubricant which may be coated onto the wires prior to the assembly procedure for the tension-torsion tie-bar. Alternatively, the dry film lubricant may be coated on the wires during the assembly procedure. The wires 20 are fed into and through a wrapping machine or apparatus as previously disclosed in the cited patents, but with a major difference comprising that the wires are dry wrapped about the bushings 12 and 14. In other words, resin material such as the previously used carcinogenic urethanes are not utilized in the wrapping process. The bands of wires disposed in parallel relationship are wrapped continuously about the bushings which are maintained within a fixture attached to the wrapping apparatus. When the wrapping of the bands of parallel wires 20 has been completed, there is produced a plurality of superimposed bands 22 of wires, with the cut ends of the wires attached to either the subassembly or the fixture holding the subassembly. This subassembly comprising the bushings with the superimposed bands 22 wrapped thereabout which provide side portions 24, may be used at that time in an encapsulation procedure or may be stored for an indefinite period of time and used in the encapsulation procedure at a later time.

The encapsulation procedure is effected in essentially the same manner as described in the cited Tankersley patents. A resin material 23 such as a reaction injected molded elastomeric urethane is injected within the fixture device and about the superimposed bands to provide a smooth outer contour which affords protection in handling the coupling, and providing a solid body 26 of resin material between spaced-apart side portions 24. Alternatively, the material 23 may be an elastomeric thermoplastic or thermosetting urethane. The resin coated tie-bar assembly is then subjected to a cure process so that the resin material is completely polymerized. The product comprises the tie-bar assembly 10 which appears as a smooth surfaced, solid body comprising spaced-apart bushings 12 and 14, spaced-apart side portions 24 each encapsulating the superimposed bands 22 therein, and the solid body of resin material 26 disposed between the side portions.

The tie-bar assembly of the present invention presents substantial advantages in assembly procedures and manufacturing costs, and provides a superior product as compared to prior urethane impregnated tie-bar assemblies. Because the tie-bar assembly 10 is wrapped dry, there is no messy debris to clean up after the wrapping assembly, and more importantly, there is no carcinogenic material involved whereby protective clothing and a specially restricted wrapping area are not necessary for the wrapping procedure. The wrapping procedure may proceed at a more scheduled pace, with less criticality as to the time period of the wrapping procedure, because the dry film coated wire strands are dry wrapped and thus matrix pot life is not a factor in the wrapping procedure. The encapsulation procedure can be performed at any time after the wrapping procedure, there being no need to accomplish this immediately thereafter because, again, matrix pot life is not involved. A wider choice of materials may be utilized for the encapsulating procedure. In the prior constructions, the encapsulation generally required that the same type of resin as the matrix material be used. The prior resins usually fell in the category of the castable type rather than the easier to process and less expensive reaction injection molded urethanes. The reaction injected molded urethanes are not only cheaper, but also are non-carcinogenic.

The tie-bar assembly of the present invention provides a product that is superior to prior urethane impregnated tie-bar assemblies. Because the individual wires are not separated and bonded by a urethane matrix, the wires are free to move relative to one another in order to more efficiently dissipate the uneven stresses and forces exerted on the wires in the vicinity of the bushings which provide for attachment of the tie-bar assembly to the stress flexing structures. The dry film lubricant comprising graphite, molybdenum disulfide, or any other suitable dry powder or material applied to the wire prior to assembly, separates the wires and lubricates the interfaces so that stress concentrations are not built up in the areas adjacent the bushings. When axial and torsional forces are exerted on the bushings, the laminations of wire strands at the bushings receive these forces and evenly dissipate the stresses to the regions of the wires disposed between the bushings. It should be clearly understood that the low modulus material or non-carcinogenic urethane material used in the encapsulation process and providing solid body 26 between spaced-apart side portions 24, keeps the bushings in their spaced-apart relationship and maintains the compressive tension exerted by the wire strand laminations tightly wrapped around the bushings. Thus, central body portion 26 maintains bushings 12, 14 in their spaced apart relationship and maintains the superimposed bands in parallel relationship without penetrating between the bands to form the urethane matrix provided in prior art assemblies. Because the urethane material does not penetrate into the parallel strands of superimposed bands, the bands are free to move relative to one another during operational twisting cycles. Additionally, the elimination of the urethane matrix enables the cross section of superimposed bands at the regions between the bushings to be substantially identical to the cross section of the same bands in the areas at the bushings. Thus, there is no variation in the thickness of the cross sections which would increase the tie-bar envelope, and which occurred in the prior constructions because of the urethane matrix.

The precoated, dry film lubricated wires are free to move and the lubricant prevents galling or rubbing abrasion between the wires. Because of the higher compressive strength of the dry film lubricant, the lubricant will be more effective in preventing galling than did the urethane impregnated structures. Urethane has a compressive strength of approximately five Hectobars, while the dry film lubricant has a compressive strength of approximately three hundred forty-five Hectobars. The tension-torsion tie-bar of the present invention can withstand higher load and is more durable than the urethane impregnated tie-bar constructions. Because the present invention does not require a urethane matrix between the wires, there are no undesirable sheer bonds provided and thus the tie-bars do not become limp and delaminated after limited usage because of the deterioration of the shear bonds. Also eliminated is the requirement that some urethane impregnated tie-bar constructions had to incorporate a nylon corset as a redundant feature to mitigate the effects of delamination which occurred after the sheer bonds eventually deteriorated.

The solid film lubricant used in the present invention will allow unhampered sheer deflections between the wires. This was not true of the prior urethane impregnated tie-bar constructions which tended to bond the wires together and restrict movement of the wires relative to one another and thereby caused stress concentration. It has been found that the complex strain patterns in tie-bars requires that the wires be able to shift freely relative to each other in order to avoid stress concentrations. This is effectively accomplished by the tie-bar construction of the present invention. Tie-bars assembled in accordance with the present invention have demonstrated a strong fatigue performance that was superior to that exhibited by the prior urethane impregnated tie-bar constructions. The tie-bars maintained their shape and torsional stiffness throughout testing and provided superior results. A performance comparison is shown in FIG. 4. FIG. 4 illustrates a performance test comparison between a wet-wrapped urethane impregnated tie-bar (A) and three tie-bars with internal lubrication (B, C, and D) and made in accordance with the present invention. Each tie-bar A–D was subjected to torsion (twisting) and tension (stretching). FIG. 4 illustrates the superiority of tie-bars having internal lubrication.

Although this invention has been described in connection with the illustrated embodiment, it will be obvious to those skilled in the art that various changes may be made in the form, structure, and arrangement of parts without departing from the invention.

I claim:

1. A method for making a tension-torsion tie-bar of dry film lubricant-coated filaments, a non-carcinogenic adhesive material disposed about and between bushings and parallel spaced-apart side portions of band formation of the filaments, the bushings and spaced-apart side formations defining an area therebetween and adhesive material filling completely the area to provide a body of material for maintaining compressive tension between said bushings by keeping the bushings in spaced-apart relationship to one another, the filaments disposed closely adjacent to one another and to filaments of adjacent superimposed band formations, the adhesive material extending to and surrounding perimeters of the side portions and not extending between adjacent filaments and superimposed band formations so that tension-torsion forces exerted on the tie-bar effect movement of the filaments relative to one another without restraint thereof by said adhesive material, comprising the steps of:

drawing said dry film lubricant-coated filaments form uniformly rotating spools;

drawing said filaments through a die to arrange each of said filaments parallel to each other in a band formation;

attaching an end of the band formation to one of two spaced-apart flanged bushings in a rotating fixture;

rotating said fixture to wrap the band formations about each of the bushings and between the flanges thereof;

cutting the band formation of filaments when a sufficient number of layers thereof have been wrapped about said bushings to form a lamination of band formations;

securing the loose end of said band formation of filaments;

performing one of the steps selected from the group consisting of (a) keeping said fixture, bushings, and lamination until said lamination is to be encapsulated in said non-carcinogenic adhesive material, and (b) encapsulating the lamination of band formations by application of the adhesive material thereabout and curing to polymerize the material.

2. The method of accordance with claim 1, wherein noncoated filaments are drawn from said spools and then coated with a dry film lubricant comprising one of graphite and molybdenum disulfite.

3. The method in accordance with claim 1, wherein said adhesive material comprises a low modulus urethane.

4. The method is accordance with claim 1, wherein said adhesive material filling said area provides a singular mechanism which keeps the bushings in spaced-apart relationship and maintains structural stability of the tie-bar.

5. The method in accordance with claim 1, wherein said adhesive material is chosen from a group consisting of a reaction injected molded elastomeric urethene, an elastomeric thermoplastic, and a thermosetting urethane.

6. The method in accordance with claim 1, wherein said dry film lubricant is chosen from a group consisting of graphite and molybdenum disulfite.

* * * * *

UNITED STATES PATENT AND TRADEMARK OFFICE
CERTIFICATE OF CORRECTION

PATENT NO. : 4,973,372
DATED : November 27, 1990
INVENTOR(S) : Richard J. Ditlinger It is certified that error appears in the above-identified patent and that said Letters Patent is hereby corrected as shown below:

Title Page, item [60], line 2, delete "continuation-in-part" and insert ---continuation---.

Signed and Sealed this

Nineteenth Day of May, 1992

Attest:

DOUGLAS B. COMER

*Attesting Officer*  *Acting Commissioner of Patents and Trademarks*